(12) United States Patent
Tang

(10) Patent No.: US 12,114,235 B2
(45) Date of Patent: Oct. 8, 2024

(54) SHORT MESSAGE SERVICE ABILITY UPDATING METHOD, DEVICE AND APPARATUS

(71) Applicant: DATANG MOBILE COMMUNICATIONS EQUIPMENT CO., LTD., Beijing (CN)

(72) Inventor: Tingfang Tang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 140 days.

(21) Appl. No.: 18/076,402

(22) Filed: Dec. 7, 2022

(65) Prior Publication Data
US 2023/0098825 A1 Mar. 30, 2023

Related U.S. Application Data

(63) Continuation of application No. 17/048,101, filed as application No. PCT/CN2019/078158 on Mar. 14, 2019, now abandoned.

(30) Foreign Application Priority Data

Apr. 16, 2018 (CN) .......................... 201810339633.3

(51) Int. Cl.
*H04W 4/14* (2009.01)
*H04W 8/02* (2009.01)
(Continued)

(52) U.S. Cl.
CPC ............... *H04W 4/14* (2013.01); *H04W 8/02* (2013.01); *H04W 8/18* (2013.01); *H04W 60/04* (2013.01); *H04W 68/005* (2013.01)

(58) Field of Classification Search
CPC ........... H04W 4/14; H04W 8/02; H04W 8/18; H04W 60/04; H04W 68/005
See application file for complete search history.

(56) References Cited

U.S. PATENT DOCUMENTS

| 2013/0268604 A1 | 10/2013 | Gupta et al. |
| 2016/0127968 A1* | 5/2016 | Velev ................... H04W 76/10 |
| | | 370/331 |
| 2019/0021064 A1* | 1/2019 | Ryu ...................... H04W 60/06 |

FOREIGN PATENT DOCUMENTS

WO 2010048834 A1 5/2010

OTHER PUBLICATIONS

Huawei et al.,"TS23.501: Update of SMS over NAS", SA WG2 Meeting #119, Feb. 13-17, 2017, Dubrovnik, Croatia, total 5 pages, S2-170987.

(Continued)

*Primary Examiner* — Wayne H Cai
(74) *Attorney, Agent, or Firm* — Kilpatrick Townsend & Stockton LLP

(57) ABSTRACT

Disclosed in the present application are a short message service (SMS) ability updating method, device and apparatus. The method includes a mobility management function receives a triggering condition of an SMS function/a user data management function, and/or, the mobility management function determines that SMS over NAS ability update needs to be triggered; the mobility management function updates the SMS over NAS ability of a UE. By using the present application, when a mobility management function receives a triggering condition of an SMS function/a user data management function, and/or, the mobility management function determines that SMS over NAS ability update needs to be triggered, the mobility management function updates the SMS over NAS ability of the UE. The SMS over (Continued)

NAS ability update can be triggered by means of a network side, thereby preventing the UE from making an erroneous SMS transmission attempt.

16 Claims, 8 Drawing Sheets

(51) Int. Cl.
    *H04W 8/18*     (2009.01)
    *H04W 60/04*     (2009.01)
    *H04W 68/00*     (2009.01)

(56) References Cited

OTHER PUBLICATIONS

Samsung et al.,"Adding SMS over NAS to the Registration procedure", 3GPP TSG-CT WG1 Meeting #108, Gothenburg (Sweden), Jan. 22-26, 2018, total 12 pages, C1-180487.

\* cited by examiner

SHORT MESSAGE SERVICE ABILITY UPDATING METHOD, DEVICE AND APPARATUS

The present application is a continuation of U.S. patent application Ser. No. 17/048,101, filed on Oct. 16, 2020, which is a national stage of International Application No. PCT/CN2019/078158, filed on Mar. 14, 2019, claiming priority to Chinese Patent Application No. 201810339633.3, filed with the Chinese Patent Office on Apr. 16, 2018, which are hereby incorporated by reference in their entirety.

FIELD

The present application relates to the field of wireless communication technologies, and particularly to a method Short Message service (SMS) over Non Access Stratum (NAS) support capability of a User Equipment (UE), an Access and Mobility Management Function (AMF) and UE.

BACKGROUND

FIG. 1 is a schematic diagram of a non-roaming SMS over NAS (Short Message Service over Non Access Stratum; SMS: Short Message Service; NAS: Non Access Stratum) system architecture, and FIG. 2 is a schematic diagram of a reference interface version of the non-roaming SMS over NAS system architecture. In the figures, the SMS-GMSC (Gateway MSC for Short Message Service) and the SMS-IWMSC (Interworking MSC for Short Message Service) are MSCs (Mobile Switching Centers) with short message function, and the SMS-GMSC is an MSC with gateway function, serves the MT (Mobile Terminating)-type short messages, and is an entry switcher that receives the short messages sent from the SC (Service Center); and the SMS-IWMSC is an MSC with network interaction function, serves the MO (Mobile Originating)-type short messages, and is an export switcher that can receive the short messages from the PLMN (Public Land Mobile Network) and send the short messages to the corresponding SC. As shown, the SMS over NAS architecture provides 5G SMS over NAS support, and the SMSF (SMS Function) is a short message function that provides the function of checking the SMS over NAS support capability of a User Equipment (UE) contract and the function of forwarding short messages. The AMF (Access and Mobility Management Function) provides the forwarding of uplink and downlink short messages between a UE (User Equipment) and the SMSF through NAS Transport (NAS transmission) messages, and the selection function of the SMSF is provided by the AMF.

In terms of SMS over NAS support capability management, for the SMS over NAS support capability, the UE during registration carries the SMS requested IE (SMS requested Information Element; IE: Information Element), of which the values are as shown in Table 1 and which is used to inform the network of the UE's capability to support the SMS. The AMF determines whether the UE subscribes to the SMS service according to the subscription information obtained from the UDM (Unified Data Management), and if so, the AMF selects and activates the SMSF, and the SMSF further registers to the UDM and subscribes to the change in SMS-related subscription information. So far, both the AMF and the SMSF have created the UE context and recorded the SMS-related information, and the UDM has also recorded the address of the SMSF and the access type available for the SMS. The SMSF returns an activation success response to the AMF, and then the AMF records the SMSF address in the UE context and carries the SMS allowed IE (SMS allowed Information Element) in the registration acceptance message. The values of the SMS allowed IE are as shown in Table 1, indicating the support capability of the SMS over NAS after network negotiation.

TABLE 1

| Values of SMS requested IE/SMS allowed IE | | |
|---|---|---|
| 2 | 1 | |
| 0 | 0 | SMS over NAS not allowed |
| 0 | 1 | SMS over NAS allowed via 3GPP access only |
| 1 | 0 | SMS over NAS allowed via both 3GPP access and non-3GPP access |

FIG. 3 is a schematic diagram of a registration procedure of the SMS over NAS. As shown, the registration procedure of the SMS over NAS is as follows.

Step 301: a UE carries the SMS requested IE during registration to inform the network of the UE's capability to support the SMS.

Step 302: as in the conventional registration procedure, if the AMF relocation occurs, the old AMF notifies a new AMF of the SMSF address as a part of the UE context.

Step 303: when the SMS requested is carried in the registration request, the AMF determines whether the UE subscribes to the SMS service according to the subscription information obtained from the UDM, and if so, the AMF selects the SMSF.

Steps 304-305: the registration procedure is completed, and the AMF activates the SMS service of the user through the Nsmsf_SMService_Activate service operation provided by the SMSF, which includes AMF address, Access Type, GPSI (Generic Public Subscription Identifier) (if available) and SUPI (Subscription Permanent Identifier) information.

Step 306: the SMSF discovers the UDM and interacts with it.

Steps 307*a*-307*b*: the SMSF records or updates the UE context including the user subscription information and the AMF address. The SMSF registers to the UDM through the Nudm_UECM_Registration (UE context management registration service; CM: Context Management), and the SMSF obtains the user's SMS subscription information from the UDM through the Nudm_SDM_Get (user subscription data acquisition service; SDM: Subscriber Data Management) and subscribes to the notification on changes in subscription information.

Step 308: the SMSF returns a response to the AMF, and the AMF records the SMSF address in the UE context.

Step 309: the AMF carries the SMS allowed in the registration accept message, indicating the support of the SMS over NAS after network negotiation.

If the UE triggers, the AMF triggers or the UDM triggers (by subscription) removing the support of the SMS over NAS support capability, there is a need for the AMF and the SMSF to trigger deleting the UE context in the SMSF and the SMSF address in the UDM respectively.

In the transmission of short messages, for the SMS MO, the UE in the IDLE state firstly establishes a connection through the SR (Service Request) procedure, and then sends the SMS through the NAS UL Transport message; and the UE in the CONNECTED state sends the SMS directly through the NAS UL Transport message.

For the SMS MT, the SMSF in the IDLE state triggers the AMF to page the UE through the Namf_MT_EnableUEReachability (enable user reachability service) service. After success, the SMSF triggers the AMF to forward the SMS through the Namf_Communication_N1N2MessageTransfer (N1/N2 message forwarding service), and the AMF selects the RAT (Radio Access Technology) (3GPP or non-3GPP) according to the operator's policy when sending the DL NAS Transport message. In the case of UE unreachability, the AMF discards the message directly and does not return a transmission success message, and then the SC (Service Center) will re-initiate the SMS MT after receiving the prompt that the UE is reachable.

The disadvantage in the prior art is: how to update the SMS over NAS support capability on the network side has not been given. For example, if the SMS deregistration is initiated by the NW (network), the UE is not notified at this time, and the UE may make a wrong SMS MO attempt during this procedure.

SUMMARY

The present application provides a method, device and apparatus for updating short message service capability, to solve the problem that the network side cannot update the SMS over NAS support capability.

In a first aspect, an embodiment of the present application provides a method for updating SMS over NAS support capability of a UE, including:
receiving, by an AMF, a triggering condition of a short message function or user data management function, and/or, determining, by the AMF, that SMS over NAS support capability update needs to be triggered;
updating, by the AMF, SMS over NAS support capability of a UE.

In an implementation, updating, by the AMF, SMS over NAS support capability of the UE includes at least one of:
triggering, through a configuration update procedure, the UE to initiate a registration update procedure to update the SMS over NAS support capability; or updating the SMS over NAS support capability of the UE through a configuration update procedure; or updating the SMS over NAS support capability of the UE in a corresponding procedure.

In an implementation, triggering, through the configuration update procedure, the UE to initiate the registration update procedure to update the SMS over NAS support capability, includes carrying an indication of UE re-registration in the configuration update procedure; and carrying an indication of SMS over NAS in the registration update procedure.

In an implementation, the method further includes carrying an indication of SMS over NAS in the configuration update procedure.

In an implementation, updating the SMS over NAS support capability of the UE through the configuration update procedure includes carrying indication information of updating SMS over NAS in the configuration update procedure.

In an implementation, updating the SMS over NAS support capability of the UE in the corresponding procedure includes carrying an indication of SMS over NAS in a deregistration procedure.

In an implementation, updating the SMS over NAS support capability of the UE in the corresponding procedure includes carrying an indication of SMS over NAS in a response message of a service request.

In an implementation, an SMS Allowed IE or a mobility management cause (MM cause) is carried in the response message of the service request to indicate a change in the SMS over NAS support capability.

In an implementation, updating the SMS over NAS support capability of the UE in the corresponding procedure includes carrying an indication of SMS over NAS in a short message sending procedure.

In an implementation, the indication of SMS over NAS carried in the short message sending procedure is carried in a response returned by a short message function; or is determined and returned directly by the AMF to the UE.

In an implementation, the AMF determines that the SMS over NAS support capability update needs to be triggered when at least one of following conditions occurs:
a change in operator configuration causes a network to trigger a change in the SMS over NAS support capability; or subscription data obtained from the user data management function changes; or policy information of the user changes; or a change in relevant information is obtained through the short message function; or the UE currently performs a deregistration procedure of which an access type is non-3GPP.

In a second aspect, an embodiment of the present application provides a method for updating SMS over NAS support capability, including:
receiving, by a UE, SMS over NAS support capability update triggered by an AMF, and the SMS over NAS support capability update is triggered by the AMF when receiving a triggering condition of a short message function or user data management function and/or determining that the SMS over NAS support capability update needs to be triggered;
updating SMS over NAS support capability of the UE according to a requirement of the AMF.

In an implementation, updating SMS over NAS support capability of the UE according to the requirement of the AMF, includes at least one of:
triggering, through a configuration update procedure, the UE to initiate a registration update procedure to update the SMS over NAS support capability; or updating the SMS over NAS support capability of the UE through a configuration update procedure; or updating the SMS over NAS support capability of the UE in a corresponding procedure.

In an implementation, triggering, through the configuration update procedure, the UE to initiate the registration update procedure to update the SMS over NAS support capability includes receiving an indication of UE re-registration carried by the AMF in the configuration update procedure; and receiving an indication of SMS over NAS carried in the registration update procedure.

In an implementation, the method further includes receiving an indication of SMS over NAS carried in the configuration update procedure.

In an implementation, updating the SMS over NAS support capability of the UE through the configuration update procedure includes receiving indication information of updating SMS over NAS carried in the configuration update procedure.

In an implementation, updating the SMS over NAS support capability of the UE in the corresponding procedure includes receiving an indication of SMS over NAS carried in a deregistration procedure.

In an implementation, updating the SMS over NAS support capability of the UE in the corresponding procedure includes receiving an indication of SMS over NAS carried in a response message of a service request.

In an implementation, an SMS Allowed IE or an MM cause is carried in the response message of the service request to indicate a change in the SMS over NAS support capability.

In an implementation, updating the SMS over NAS support capability of the UE in the corresponding procedure includes receiving an indication of SMS over NAS carried in a short message sending procedure.

In an implementation, the indication of SMS over NAS carried in the short message sending procedure is carried in a response returned by a short message function; or is determined and returned directly by the AMF to the UE.

In a third aspect, an embodiment of the present application provides an AMF, including:
 a transceiver configured to receive and send data under control of a processor;
 a processor configured to read programs in a memory to perform receiving a triggering condition of a short message function or user data management function, and/or, determining that SMS over NAS support capability update needs to be triggered; updating SMS over NAS support capability of a UE.

In an implementation, updating SMS over NAS support capability of a UE includes at least one of:
 triggering, through a configuration update procedure, the UE to initiate a registration update procedure to update the SMS over NAS support capability; or updating the SMS over NAS support capability of the UE through a configuration update procedure; or updating the SMS over NAS support capability of the UE in a corresponding procedure.

In an implementation, triggering, through the configuration update procedure, the UE to initiate the registration update procedure to update the SMS over NAS support capability includes carrying an indication of UE re-registration in the configuration update procedure; and carrying an indication of SMS over NAS in the registration update procedure.

In an implementation, the procedure further includes carrying an indication of SMS over NAS in the configuration update procedure.

In an implementation, updating the SMS over NAS support capability of the UE through the configuration update procedure includes carrying indication information of updating SMS over NAS in the configuration update procedure.

In an implementation, updating the SMS over NAS support capability of the UE in the corresponding procedure includes carrying an indication of SMS over NAS in a deregistration procedure.

In an implementation, updating the SMS over NAS support capability of the UE in the corresponding procedure includes carrying an indication of SMS over NAS in a response message of a service request.

In an implementation, an SMS Allowed IE or an MM cause is carried in the response message of the service request to indicate a change in the SMS over NAS support capability.

In an implementation, updating the SMS over NAS support capability of the UE in the corresponding procedure includes carrying an indication of SMS over NAS in a short message sending procedure.

In an implementation, the indication of SMS over NAS carried in the short message sending procedure is carried in a response returned by a short message function; or is determined and returned directly to the UE.

In an implementation, the AMF determines that the SMS over NAS support capability update needs to be triggered when at least one of following conditions occurs:
 a change in operator configuration causes a network to trigger a change in the SMS over NAS support capability; or subscription data obtained from the user data management function changes; or policy information of the user changes; or a change in relevant information is obtained through the short message function; or the UE currently performs a deregistration procedure of which an access type is non-3GPP.

In a fourth aspect, an embodiment of the present application provides a UE, including:
 a transceiver configured to receive and send data under control of a processor;
 a processor configured to read programs in a memory to perform of: receiving SMS over NAS support capability update triggered by an AMF, and the SMS over NAS support capability update is triggered by the AMF when receiving a triggering condition of a short message function or user data management function and/or determining that the SMS over NAS support capability update needs to be triggered; updating SMS over NAS support capability of the UE according to a requirement of the AMF.

In an implementation, updating SMS over NAS support capability of the UE according to a requirement of the AMF, includes at least one of:
 triggering, through a configuration update procedure, the UE to initiate a registration update procedure to update the SMS over NAS support capability; or
 updating the SMS over NAS support capability of the UE through a configuration update procedure; or
 updating the SMS over NAS support capability of the UE in a corresponding procedure.

In an implementation, triggering the UE to initiate a registration update procedure to update the SMS over NAS support capability through the configuration update procedure includes receiving an indication of UE re-registration carried by the AMF in the configuration update procedure; and receiving an indication of SMS over NAS carried in the registration update procedure.

In an implementation, the method further includes receiving an indication of SMS over NAS carried in the configuration update procedure.

In an implementation, updating the SMS over NAS support capability of the UE through the configuration update procedure includes receiving indication information of updating SMS over NAS carried in the configuration update procedure.

In an implementation, updating the SMS over NAS support capability of the UE in the corresponding procedure includes receiving an indication of SMS over NAS carried in a deregistration procedure.

In an implementation, updating the SMS over NAS support capability of the UE in the corresponding procedure includes receiving an indication of SMS over NAS carried in a response message of a service request.

In an implementation, an SMS Allowed IE or an MM cause is carried in the response message of the service request to indicate a change in the SMS over NAS support capability.

In an implementation, updating the SMS over NAS support capability of the UE in the corresponding procedure includes receiving an indication of SMS over NAS carried in a short message sending procedure.

In an implementation, the indication of SMS over NAS carried in the short message sending procedure is carried in a response returned by a short message function; or is determined and returned directly by the AMF to the UE.

In a fifth aspect, an embodiment of the present application provides an apparatus for updating SMS over NAS support capability, including:

a judging device configured to receive a triggering condition of a short message function or user data management function at an AMF, and/or, determine that SMS over NAS support capability update needs to be triggered at the AMF;

an AMF update device configured to update SMS over NAS support capability of a UE at the AMF.

In a sixth aspect, an embodiment of the present application provides an apparatus for updating SMS over NAS support capability, including:

a receiving device configured to receive SMS over NAS support capability update triggered by an AMF at a UE, and the SMS over NAS support capability update is triggered by the AMF when receiving a triggering condition of a short message function or user data management function and/or determining that the SMS over NAS support capability update needs to be triggered;

a UE update device configured to update SMS over NAS support capability of the UE according to a requirement of the AMF.

In a seventh aspect, an embodiment of the present application provides a computer readable storage medium storing the computer instructions that, when running on a computer, cause the computer to perform the method described by any implementation in the first aspect as described above.

In an eighth aspect, an embodiment of the present application provides a computer readable storage medium storing the computer instructions that, when running on a computer, cause the computer to perform the method described by any implementation in the second aspect as described above.

BRIEF DESCRIPTION OF THE DRAWINGS

The accompanying drawings illustrated here are used to provide the further understanding of the present application and constitute a part of the present application, and the schematic embodiments of the present application and the illustration thereof are used to explain the present application but not limit the present application improperly. In the accompanying drawings.

DETAILED DESCRIPTION

The inventor noticed in the inventive process: the 3GPP R15 5GS (5G System) defines the support for SMS over NAS, including the support for SMS over NAS between the UE and AMF through 3GPP/non-3GPP, the selection of the AMF for the SMSF, the inspection of the SMSF for subscription data, and the transmission of the MO/MT SMS. The specific procedure includes the registration and deregistration of the SMS over NAS support capability to support the SMS over NAS support capability negotiation, the SMS MO procedure and the SMS MT procedure between the UE and the network. However, the procedure of triggering the SMS over NAS support capability update on the network side is not described in the current standards. Therefore, the embodiments of the present application propose a solution for updating the SMS over NAS support capability, and the SMS over NAS support capability update may also be triggered and implemented by the network side.

The embodiments of the present application will be illustrated below in combination with the drawings. In the illustration process, the behaviors of other entities (e.g., SMSF, UE, etc.) will be involved, but such illustration does not mean they must implement in cooperation or must implement alone. Actually, when they implement separately, they also solve the problems at their own sides respectively, but when they are used in combination, the better technical effect may be obtained.

In the embodiments, the AMF may be the AMF in the 5G architecture, or may include another network element that can implement the same function, where the network element may be a logical entity network element or a physical entity network element.

The short message function may be the SMSF in the 5G architecture, or may include another network element that can implement the same function, where the network element may be a logical entity network element or a physical entity network element.

The user data management function may be the UDM in the 5G architecture, or may include another network element that can implement the same function, where the network element may be a logical entity network element or a physical entity network element.

The configuration update procedure may be the Configuration Update in the 5G architecture, or other procedures that can implement the same function.

The SMS over NAS support capability may also be called the SMS over NAS support capability or short message support capability. The SMS over NAS support capability in the embodiments of the present application refers to the SMS over NAS support capability, that is, the SMS over NAS support capability. The short message sending procedure may also be called the SMS MO procedure.

In order to facilitate understanding and implementation, the embodiments of the specific AMF, SMSF, UDM, and Configuration Update are also given in the embodiments, but this does not mean that the implementation can only be made by them.

Figure 1:
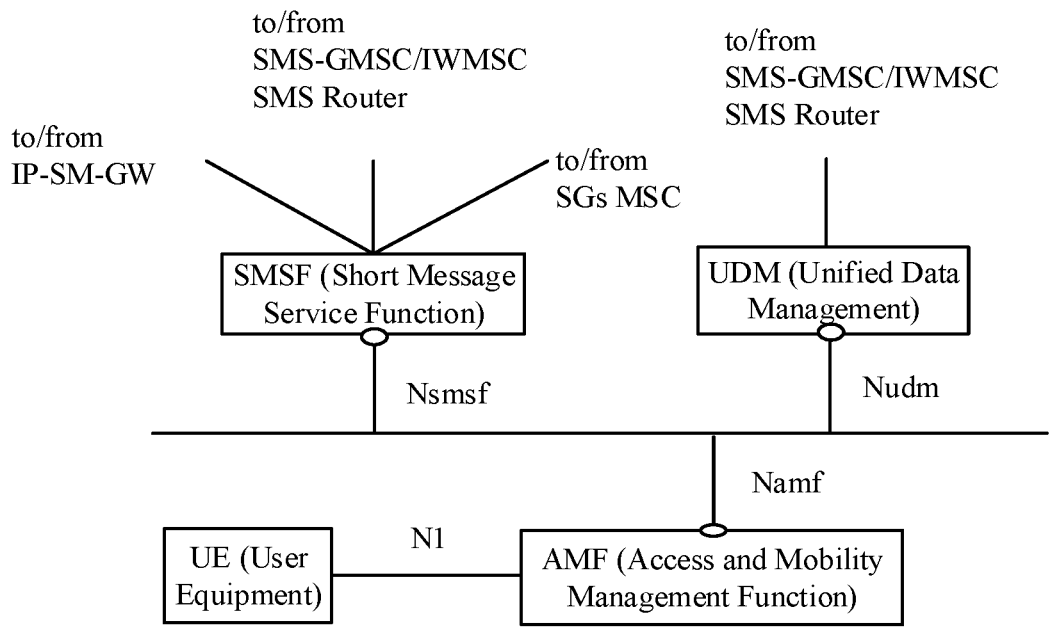
FIG. 1 is a schematic diagram of a non-roaming SMS over NAS system architecture in the background art.
Figure 2:
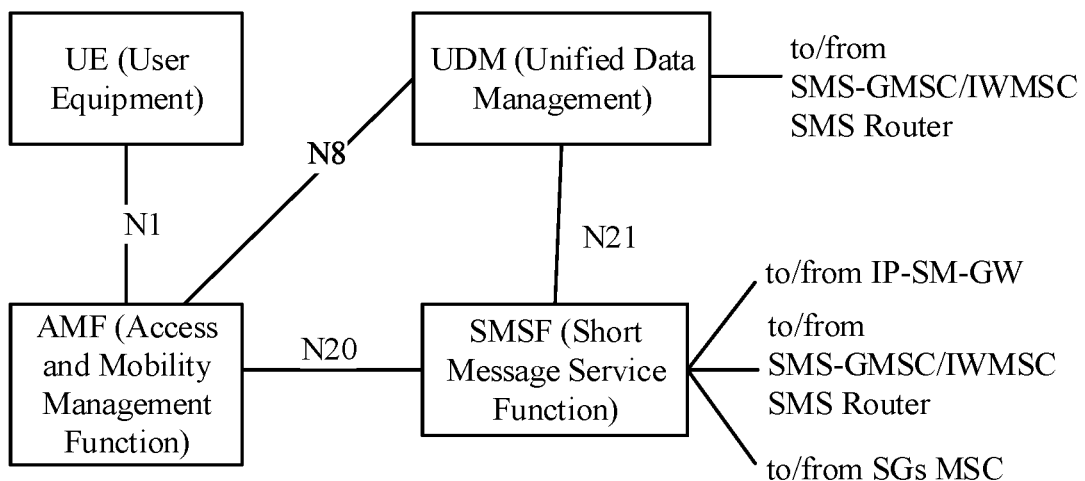
FIG. 2 is a schematic diagram of a reference interface version of the non-roaming SMS over NAS system architecture in the background art.
Figure 3:
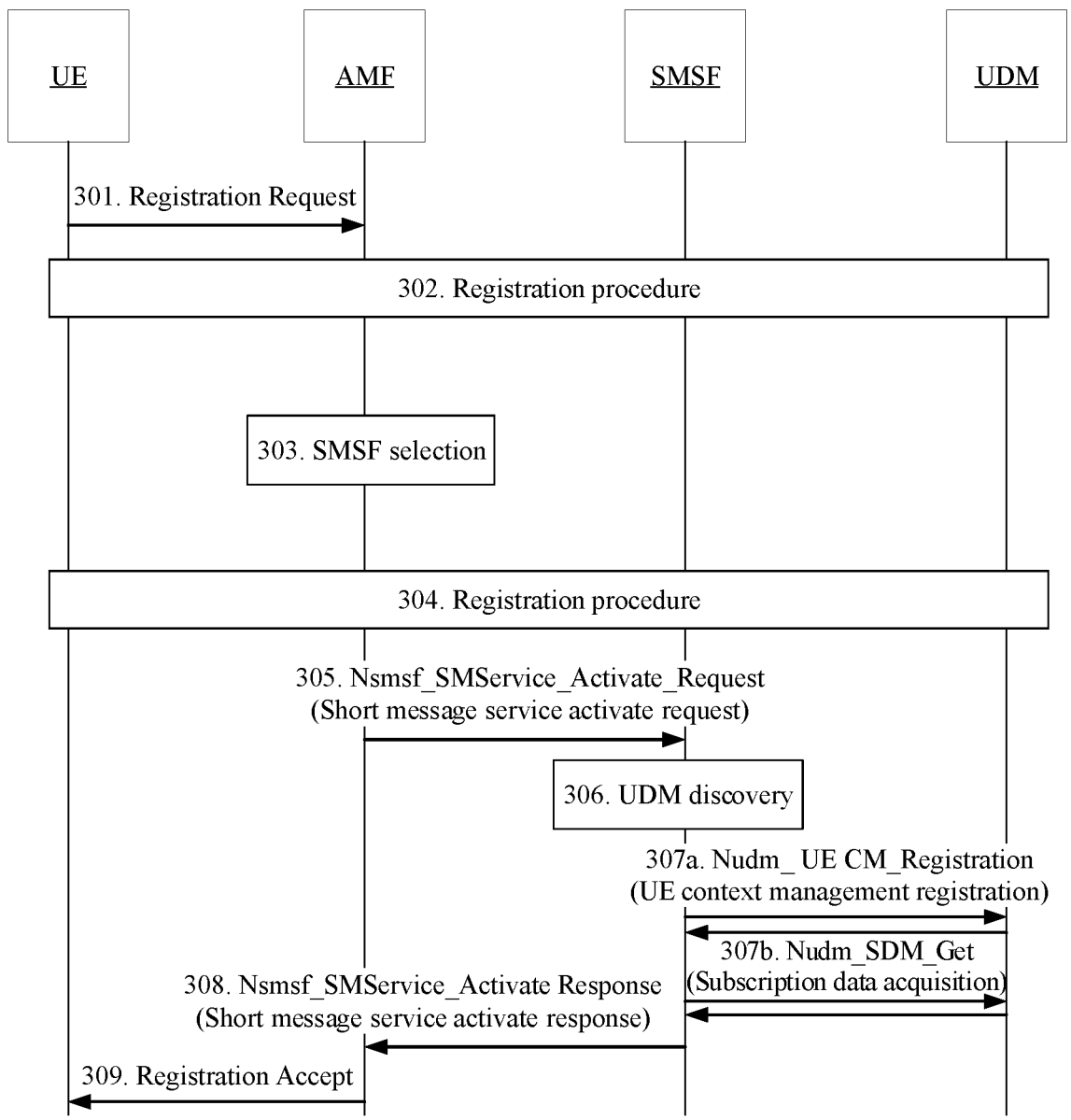
FIG. 3 is a schematic diagram of the SMS over NAS registration procedure in the background art.
Figure 4:
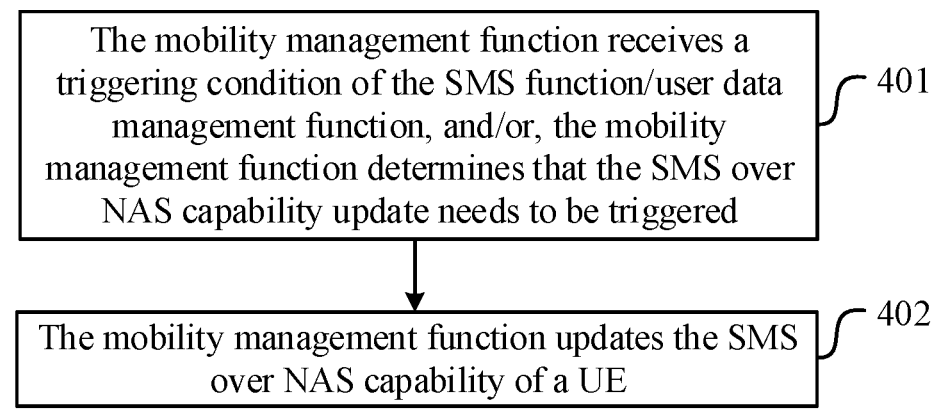
FIG. 4 is a schematic diagram of a method for updating SMS over NAS support capability in the mobile management function according to an embodiment of the present application.

FIG. 4 is a schematic diagram of a method for updating SMS over NAS support capability on the mobile management function side. As shown, the method may include the following steps.

Step 401: the AMF receives a triggering condition of the SMS function/user data management function, and/or, the AMF determines that the SMS over NAS support capability update needs to be triggered.

Step 402: the AMF updates the SMS over NAS support capability of a UE.

Correspondingly, the SMS over NAS support capability update scheme of the UE is further provided in an embodiment of the present application as follows.

Figure 5:
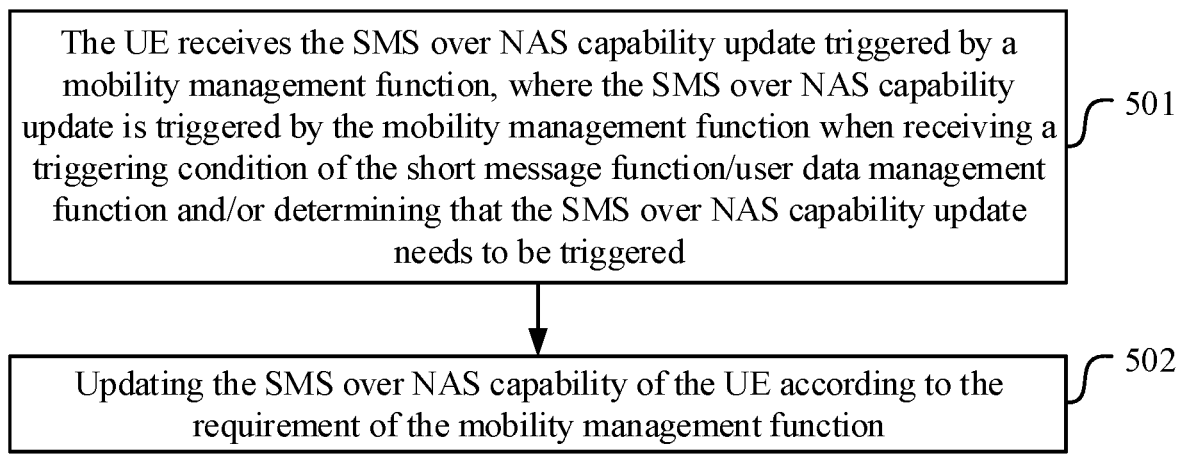
FIG. 5 is a schematic diagram of a method for updating SMS over NAS support capability in the UE according to an embodiment of the present application.

FIG. 5 is a schematic diagram of a method for updating SMS over NAS support capability in the UE. As shown, the method may include the following steps.

Step 501: the UE receives the SMS over NAS support capability update triggered by an AMF, where the SMS over NAS support capability update is triggered by the AMF when receiving a triggering condition of the short message function/user data management function and/or determining that the SMS over NAS support capability update needs to be triggered.

Step 502: updating the SMS over NAS support capability of the UE according to the requirement of the AMF. That is, the UE updates the SMS over NAS support capability of the UE according to the SMS over NAS support capability update triggered by the AMF.

Specifically, for example, in the scheme of triggering the SMS over NAS support capability update at the network side, when the AMF receives the trigger condition of the short message function/user data management function or the AMF determines by itself that the SMS over NAS support capability update needs to be triggered, the AMF triggers, through the configuration update procedure, the UE to initiate the registration update procedure, or the AMF directly updates the record of the UE through the configuration update procedure, or the AMF performs update of the relevant data of the UE in the corresponding procedure, and the corresponding procedure includes a procedure related to the short message service or short message transmission. That is, in an implementation, the AMF updates the SMS over NAS support capability of the UE, including at least one of:

triggering, through a configuration update procedure, the UE to initiate a registration update procedure to update the SMS over NAS support capability; or updating the SMS over NAS support capability of the UE through a configuration update procedure; or updating the SMS over NAS support capability of the UE in a corresponding procedure.

In an implementation, the AMF determines that the SMS over NAS support capability update needs to be triggered when at least one of following conditions occurs:

a change in operator configuration causes a network to trigger a change in the SMS over NAS support capability; or subscription data obtained from the user data management function changes; or policy information of the user changes; or a change in relevant information is obtained through the short message function; or the UE currently performs a deregistration procedure of which an access type is non-3GPP.

In the technical solution provided by the embodiments of the present application, when the AMF receives the trigger condition of the short message function or the user data management function, and/or the AMF determines that the SMS over NAS support capability update needs to be triggered, the AMF updates the SMS over NAS support capability of the UE. The update of the SMS over NAS support capability can be triggered by the network side, thereby avoiding the UE from making a wrong attempt to send short messages.

The application will be illustrated below by way of examples.

First Embodiment

In this embodiment, the SMSF is triggered by the AMF to perform the update of the UE context related to the SMS over NAS; the AMF updates the SMS over NAS support capability of the UE through the configuration update procedure, and the updated indication information of the SMS over NAS is carried to indicate the UE to re-register; and after UE returns the configuration update complete, the UE initiates a registration update procedure to re-negotiate the SMS over NAS support capability with the network, and complete the update of the SMS over NAS in this procedure.

Specifically, triggering through the configuration update the UE to initiate the registration update procedure to update the SMS over NAS support capability may include:

indicating the UE to re-register in the configuration update procedure;

carrying an indication of SMS over NAS in the registration update procedure.

In a specific implementation, the method may further include carrying an indication of SMS over NAS in the configuration update procedure.

It is assumed that the network triggers the change in SMS over NAS support capability due to the change in operator configuration. For example, the AMF judges and decides to change the original SMS over NAS allowed via both 3GPP access and non-3GPP access to the SMS over NAS allowed via 3GPP access only.

Figure 6:
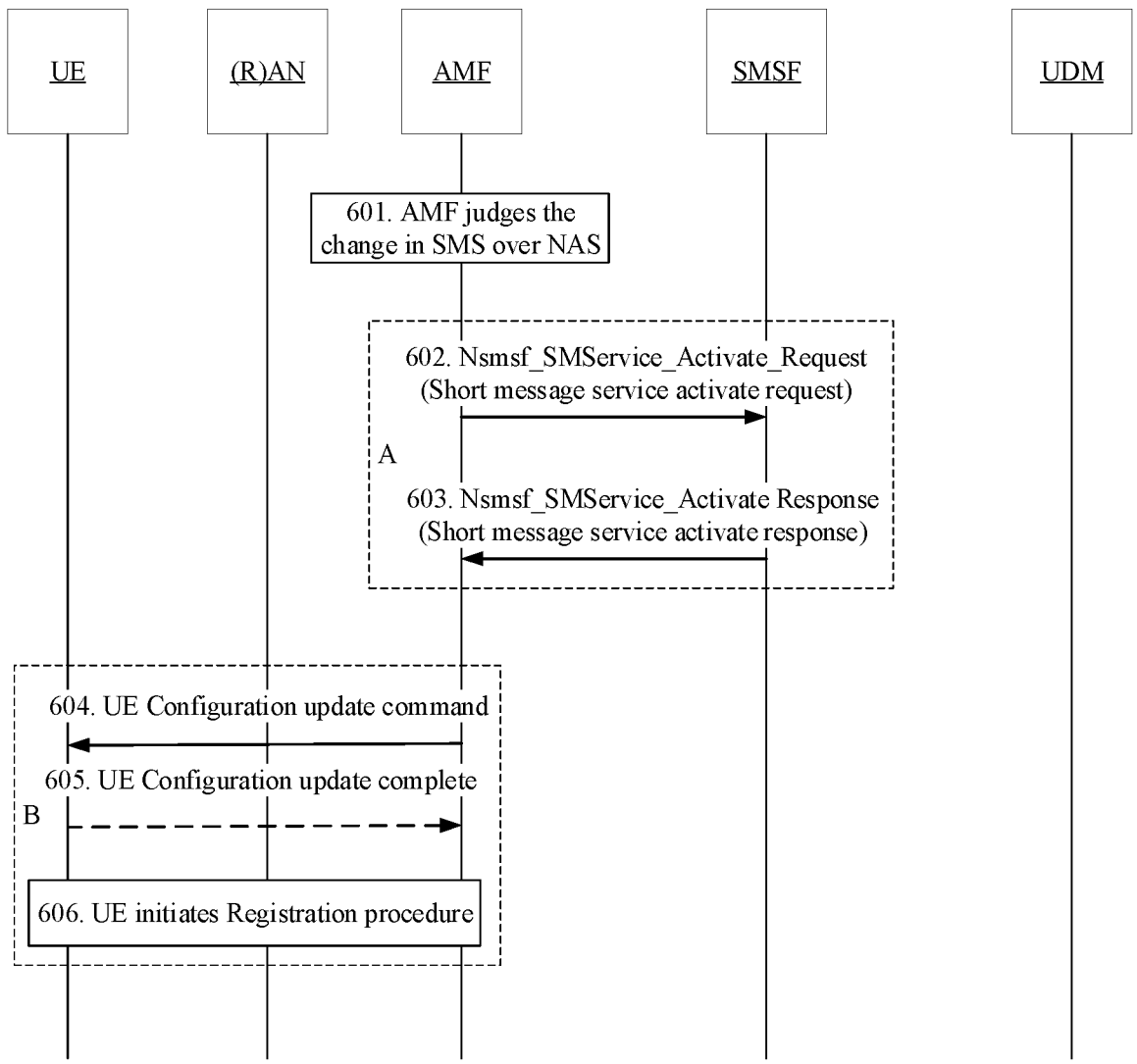
FIG. 6 is a schematic diagram of a method for updating SMS over NAS support capability according to a first embodiment of the present application.

FIG. 6 is a schematic diagram of a method for updating SMS over NAS support capability according to the first embodiment. As shown, the method may include the following steps.

Step 601: the AMF determines that the original SMS over NAS needs to be updated, for example, changing from the SMS over NAS allowed via both 3GPP access and non-3GPP access to the SMS over NAS allowed via 3GPP access only.

Part A:

Steps 602-603: AMF triggers the SMSF to perform the update of the UE context related to the SMS over NAS.

Part B:

Step 604: the AMF updates, through the configuration update procedure, the SMS over NAS support capability of the UE, and the updated indication information of the SMS over NAS is carried, the AMF indicates the UE to re-register, and the AMF may further indicate the UE to return a response message after completing the update.

Step 605: the UE returns the configuration update complete to the AMF.

Step 606: the UE initiates a registration update procedure to re-negotiate the SMS over NAS support capability with the network immediately after returning the configuration update complete. The update of the SMS over NAS is completed in this procedure.

The process of parts A and B can be in no particular order, or A first and then B, or B first and then A.

Second Embodiment

In this embodiment, the AMF triggers deleting the information related to the UE SMS over NAS in the SMSF, and the SMSF triggers deleting the SMSF address in the UDM. The AMF, through the configuration update procedure, updates the SMS over NAS support capability of UE, and the updated indication Information of the SMS over NAS is carried; and after receiving the response returned by the UE, the AMF updates the SMS over NAS recorded in the AMF to the updated support condition.

Specifically, updating, through the configuration update, the SMS over NAS support capability of the UE may include carrying the indication information of updating the SMS over NAS in the configuration update procedure.

It is assumed that the network triggers the change in SMS over NAS support capability due to the change in operator configuration. For example, the AMF judges and decides to change the original SMS over NAS allowed via both 3GPP access and non-3GPP access to the SMS over NAS not allowed. The AMF may also make a decision directly or indirectly through the change in the subscription data obtained from the UDM, for example, the user cancels the SMS subscription. The AMF is also possible to make a decision according to the policy information of the user, for example, the user cannot send short messages in arrears. The AMF is also possible to make a decision according to the change in the relevant information obtained through the SMSF.

Figure 7:
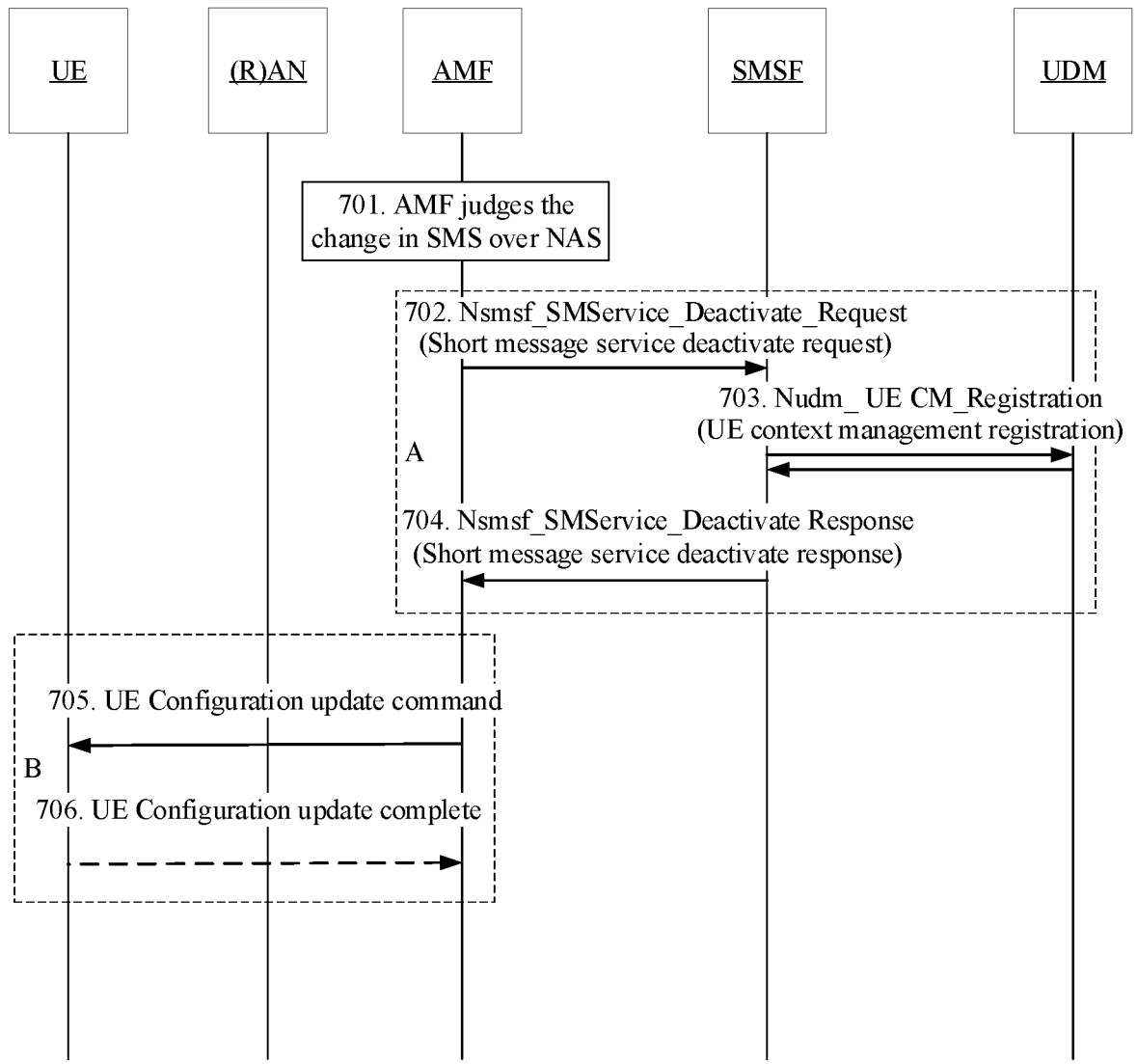
FIG. 7 is a schematic diagram of a method for updating SMS over NAS support capability according to a second embodiment of the present application.

FIG. 7 is a schematic diagram of a method for updating SMS over NAS support capability according to the second embodiment. As shown, the method may include the following steps.

Step 701: the AMF determines that the original SMS over NAS needs to be updated, for example, changing from the SMS over NAS allowed via both 3GPP access and non-3GPP access to the SMS over NAS not allowed. The AMF may also make a decision directly or indirectly through the change in the subscription data obtained from the UDM, for example, the user cancels the SMS subscription. The AMF is also possible to make a decision according to the policy information of the user, for example, the user cannot send short messages in arrears. The AMF is also possible to make a decision according to the change in the relevant information obtained through the SMSF.

Part A:

Steps 702-704: the AMF triggers deleting the information related to the UE SMS over NAS (including UE context and AMF address) in the SMSF, and the SMSF triggers deleting the SMSF address in the UDM.

Part B:

Step 705: the AMF, through the configuration update procedure, updates the SMS over NAS support capability of the UE, and the updated indication information of the SMS over NAS is carried, and the AMF may further indicate the UE to return a response message after completing the update.

Step 706: the AMF updates the SMS over NAS recorded in the AMF to the updated support condition after receiving the response returned by the UE.

The processes of parts A and B can be in no particular order, or A first and then B, or B first and then A. If the AMF does not require the UE to return a response when updating the NAS over SMS, the relevant records in the UE context in the AMF can be updated after the configuration update command message is successfully sent, that is, after step 705.

Third Embodiment

In this embodiment, the AMF triggers the SMSF to perform the update of the UE context related to the SMS over NAS. The AMF carries an indication of the updated SMS over NAS in the deregistration accept message sent to the UE, and completes the update of the local UE context.

Specifically, updating the SMS over NAS support capability of the UE in a corresponding procedure, includes carrying an indication of SMS over NAS in a deregistration procedure; or, carrying an indication of SMS over NAS in a response message of a service request.

In an implementation, an SMS Allowed IE or an MM cause is carried in the response message of the service request to indicate a change in the SMS over NAS support capability.

It is assumed that the network triggers the change in SMS over NAS support capability due to the change in operator configuration. For example, the AMF judges and decides to change the original SMS over NAS allowed via both 3GPP access and non-3GPP access to the SMS over NAS allowed via 3GPP access only. The AMF may make a decision according to the deregistration procedure of non-3GPP (access type) performed currently by the UE, and then update the SMS over NAS information recorded in the AMF, update the UE context of the SMSF, and carry the indication of the updated SMS over NAS in the deregistration accept message returned to the UE.

Figure 8:
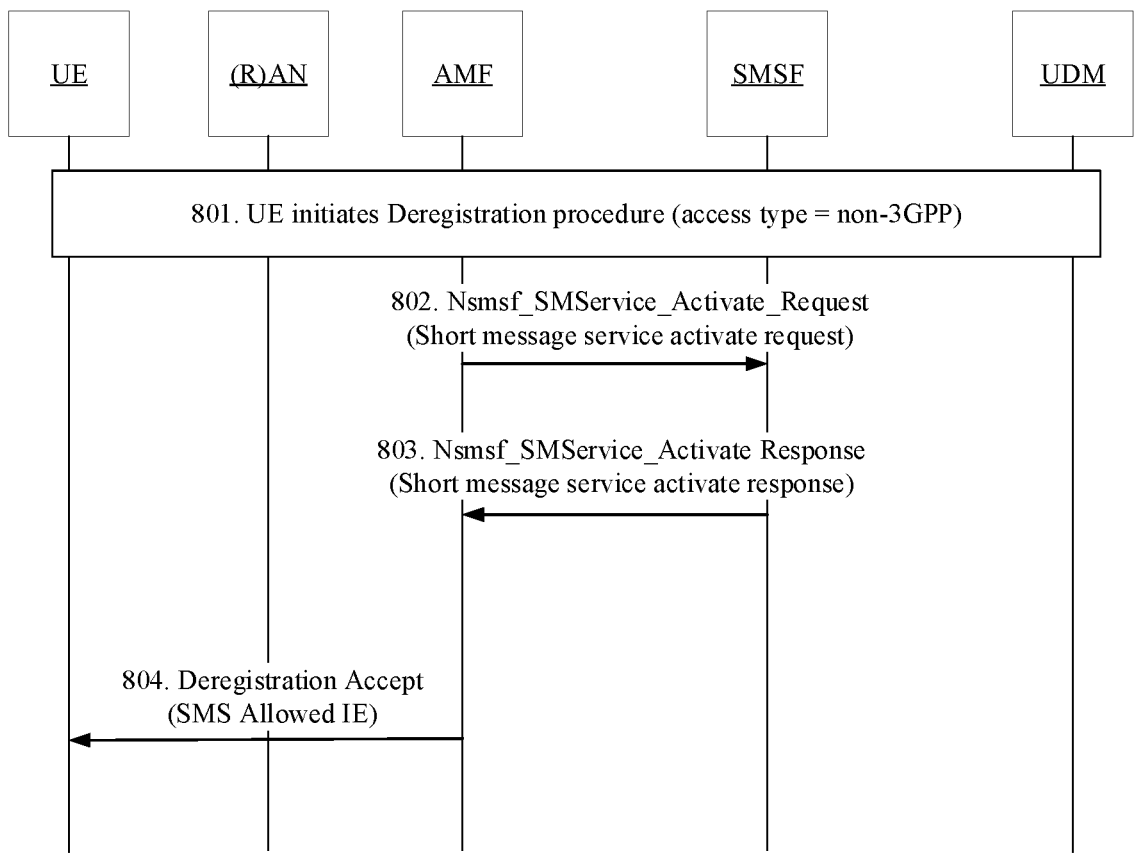
FIG. 8 is a schematic diagram of a method for updating SMS over NAS support capability according to a third embodiment of the present application.

FIG. 8 is a schematic diagram of a method for updating SMS over NAS support capability according to the third embodiment. As shown, the method may include the following steps.

Step 801: the UE triggers the non-3GPP deregistration procedure, so the AMF judges and decides to change the original SMS over NAS from SMS over NAS allowed via both 3GPP access and non-3GPP access to SMS over NAS allowed via 3GPP access only.

Steps 802-803: the AMF triggers the SMSF to perform the update of the UE context related to the SMS over NAS.

Step 804: the AMF carries an indication of the updated SMS over NAS in the deregistration accept message sent to the UE, and performs the update of the local UE context.

Fourth Embodiment

In this embodiment, the AMF carries the indication of the updated SMS over NAS in the SMS MO procedure and performs the update of the local UE context.

Specifically, updating the SMS over NAS support capability of the UE in a corresponding procedure, includes carrying an indication of SMS over NAS in an SMS sending procedure.

In an implementation, in the SMS sending procedure, the indication of SMS over NAS is carried in the CP Ack returned by the SMSF; or the indication of SMS over NAS is determined and returned directly by the AMF to the UE.

It is assumed that the network triggers the change in SMS over NAS support capability due to the change in operator configuration. For example, the AMF judges and decides to change the original SMS over NAS allowed via both 3GPP access and non-3GPP access to the SMS over NAS not allowed. The AMF local, SMSF, and UDM have completed the relevant updates. When the UE initiates the SMS MO procedure, the indication of the updated SMS over NAS is carried in the response message returned to the UE.

Figure 9:
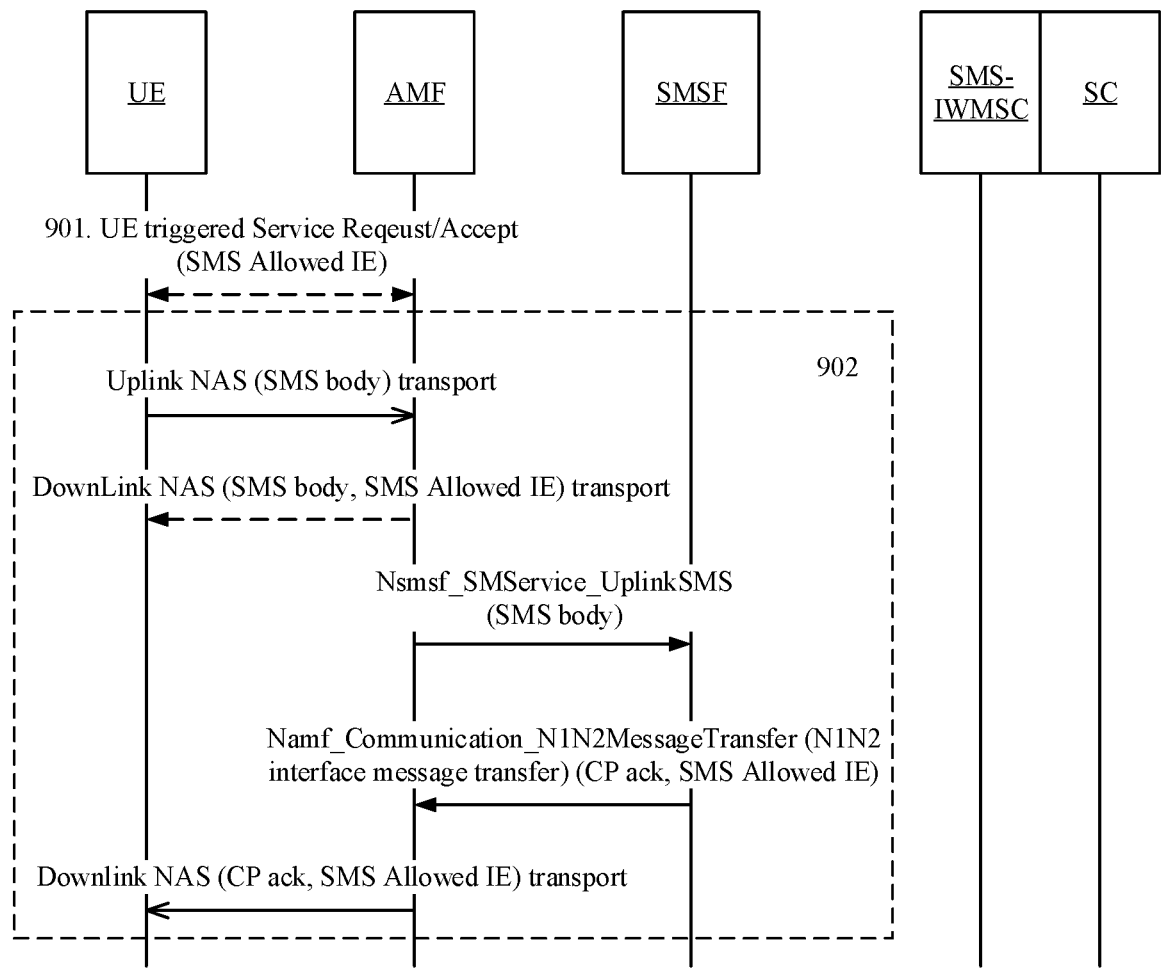
FIG. 9 is a schematic diagram of a method for updating SMS over NAS support capability according to a fourth embodiment of the present application.

FIG. 9 is a schematic diagram of a method for updating SMS over NAS support capability according to the fourth embodiment. Since the network side has completed the update of the SMS over NAS support capability, the SMS over NAS support capability of the UE can be updated in the SMS MO procedure. As shown, the method may include the following steps.

Step 901: for the UE in the CM-IDLE state, the response message to establish the N1 connection in the SR may carry the SMS Allowed IE or carry the MM cause to indicate the changed SMS over NAS support capability.

Step 902: for the UE in the CM-IDLE or CM-Connected state, the indication of SMS over NAS may be carried in the response returned after receiving the request to send the SMS MO message, where this indication may be carried in the CP Ack returned by the SMSF or may be determined and returned directly by the AMF to the UE before informing the SMSF to forward, and the parameter carried may be the SMS Allowed IE or MM cause to indicate the changed SMS over NAS support capability.

The embodiments of the present application further provide a mobile management function, a UE, and apparatuses for updating the SMS over NAS support capability. Since the principle solving the problem of these devices is similar to that of the methods for updating the SMS over NAS support capability, the implementations of these devices can refer to the implementations of the methods, and the repeated description thereof will be omitted here.

When the technical solution provided by the embodiment of the present application is implemented, it may be implemented in such way as follows.

Figure 10:
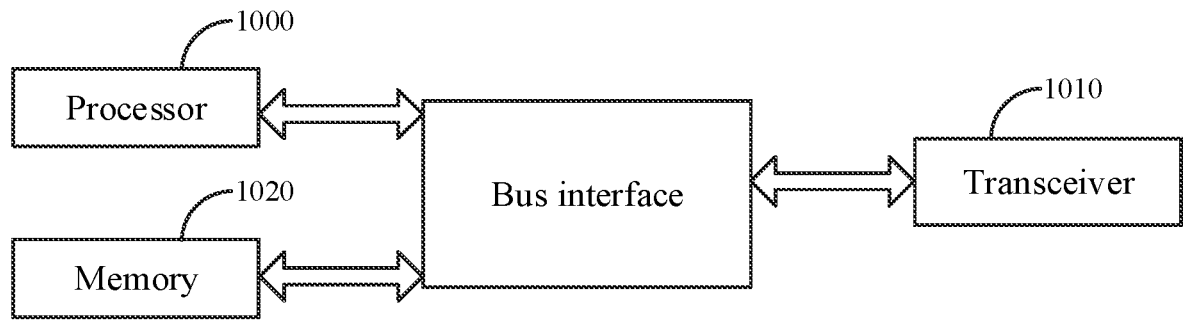
FIG. 10 is a schematic structural diagram of an AMF according to an embodiment of the present application.

FIG. 10 is a schematic structural diagram of a mobile management function. As shown, the base station includes a transceiver 1010 configured to receive and send the data under the control of a processor 1000; the processor 1000 configured to read the programs in a memory 1020 to perform: receiving a triggering condition of the SMS function/user data management function, and/or, determining that the SMS over NAS support capability update needs to be triggered; updating the SMS over NAS support capability of a UE.

In an implementation, updating the SMS over NAS support capability of a UE, includes at least one of:
triggering, through a configuration update procedure, the UE to initiate a registration update procedure to update the SMS over NAS support capability; or
updating the SMS over NAS support capability of the UE through a configuration update procedure; or
updating the SMS over NAS support capability of the UE in a corresponding procedure.

In an implementation, triggering, through the configuration update procedure, the UE to initiate the registration update procedure to update the SMS over NAS support capability, includes
carrying an indication of UE re-registration in the configuration update procedure;
carrying an indication of SMS over NAS in the registration update procedure.

In an implementation, the procedure further includes carrying an indication of SMS over NAS in the configuration update procedure.

In an implementation, updating the SMS over NAS support capability of the UE through the configuration update procedure, includes carrying the indication information of updating the SMS over NAS in the configuration update procedure.

In an implementation, updating the SMS over NAS support capability of the UE in the corresponding procedure, includes carrying an indication of SMS over NAS in a deregistration procedure.

In an implementation, updating the SMS over NAS support capability of the UE in a corresponding procedure, includes carrying an indication of SMS over NAS in a response message of a service request.

In an implementation, an SMS Allowed IE or an MM cause is carried in the response message of the service request to indicate a change in the SMS over NAS support capability.

In an implementation, updating the SMS over NAS support capability of the UE in a corresponding procedure, includes carrying an indication of SMS over NAS in an SMS sending procedure.

In an implementation, the indication of SMS over NAS carried in the SMS sending procedure is carried in the CP Ack returned by the SMS function; or is determined and returned directly to the UE.

In an implementation, the AMF determines that the SMS over NAS support capability update needs to be triggered when at least one of following conditions occurs:
a change in operator configuration causes a network to trigger a change in the SMS over NAS support capability; or
the subscription data obtained from the user data management function changes; or
the policy information of the user changes; or
a change in relevant information is obtained through the SMS function; or
the UE currently performs the deregistration procedure of which the access type is non-3 GPP.

In FIG. 10, the bus architecture may include any numbers of interconnected buses and bridges, and specifically link various circuits of one or more processors represented by the processor 1000 and the memory represented by the memory 1020. The bus architecture may further link various other circuits such as peripheral device, voltage regulator and power management circuit, which are all well known in the art and thus will not be further described again herein. The bus interface provides an interface. The transceiver 1010 can be a plurality of elements, i.e., include a transmitter and a receiver, and provide the units for communicating with various other devices over the transmission media. The processor 1000 is responsible for managing the bus architecture and general processing, and the memory 1020 may store the data used by the processor 1000 when performing the operations.

Figure 11:
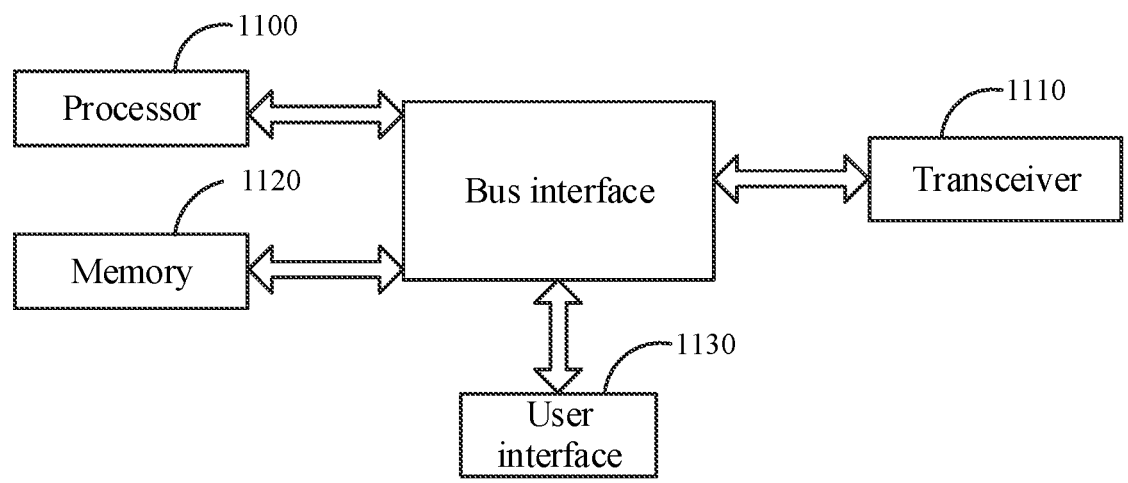
FIG. 11 is a schematic structural diagram of a UE according to an embodiment of the present application.

FIG. 11 is a schematic structural diagram of a UE. As shown, the user equipment includes a transceiver 1110 configured to receive and send the data under the control of a processor 1100; the processor 1100 configured to read the programs in a memory 1120 to perform: receiving the SMS over NAS support capability update triggered by an AMF, and the SMS over NAS support capability update is triggered by the AMF when receiving a triggering condition of the SMS function/user data management function and/or determining that the SMS over NAS support capability update needs to be triggered; updating the SMS over NAS support capability of the UE according to the requirement of the AMF.

In an implementation, updating the SMS over NAS support capability of the UE according to the requirement of the AMF, includes at least one of:

triggering, through a configuration update procedure, the UE to initiate a registration update procedure to update the SMS over NAS support capability; or updating the SMS over NAS support capability of the UE through a configuration update procedure; or updating the SMS over NAS support capability of the UE in a corresponding procedure.

In an implementation, triggering, through a configuration update procedure, the UE to initiate the registration update procedure to update the SMS over NAS support capability includes receiving an indication of UE re-registration carried by the AMF in the configuration update procedure;

receiving an indication of SMS over NAS carried in the registration update procedure.

In an implementation, the procedure further includes receiving an indication of SMS over NAS carried in the configuration update procedure.

In an implementation, updating the SMS over NAS support capability of the UE through a configuration update procedure, includes receiving the indication information of updating the SMS over NAS carried in the configuration update procedure.

In an implementation, updating the SMS over NAS support capability of the UE in the corresponding procedure, includes receiving an indication of SMS over NAS carried in a deregistration procedure.

In an implementation, updating the SMS over NAS support capability of the UE in a corresponding procedure, includes receiving an indication of SMS over NAS carried in a response message of a service request.

In an implementation, an SMS Allowed IE or an MM cause is carried in the response message of the service request to indicate a change in the SMS over NAS support capability.

In an implementation, updating the SMS over NAS support capability of the UE in a corresponding procedure, includes receiving an indication of SMS over NAS carried in an SMS sending procedure.

In an implementation, the indication of SMS over NAS carried in the SMS sending procedure is carried in the CP Ack returned by the SMS function; or is determined and returned directly by the AMF to the UE.

In FIG. 11, the bus architecture can include any numbers of interconnected buses and bridges, and specifically link various circuits of one or more processors represented by the processor 1100 and the memory represented by the memory 1120. The bus architecture may further link various other circuits such as peripheral device, voltage regulator and power management circuit, which are all well known in the art and thus will not be further described again herein. The bus interface provides an interface. The transceiver 1110 can be a plurality of elements, i.e., include a transmitter and a receiver, and provide the units for communicating with various other devices over the transmission media. For different user equipments, the user interface 1130 can also be the interface capable of inter-connecting or exter-connecting with the required devices, and the connected devices include but not limited to keypad, display, loudspeaker, microphone, joystick and the like.

The processor 1100 is responsible for managing the bus architecture and general processing, and the memory 1120 can store the data used by the processor 1100 when performing the operations.

An embodiment of the present application further provides an apparatus for updating the SMS over NAS support capability, including:

a judging device configured to receive a triggering condition of the SMS function/user data management function at an AMF, and/or, determine that the SMS over NAS support capability update needs to be triggered at the AMF;

an AMF update device configured to update the SMS over NAS support capability of a UE at the AMF.

The specific implementations can refer to the implementations of the above method or AMF.

An embodiment of the present application further provides an apparatus for updating the SMS over NAS support capability, including:

a receiving device configured to receive the SMS over NAS support capability update triggered by an AMF at a UE, and the SMS over NAS support capability update is triggered by the AMF when receiving a triggering condition of the SMS function/user data management function and/or determining that the SMS over NAS support capability update needs to be triggered;

a UE update device configured to update the SMS over NAS support capability of the UE according to a requirement of the AMF.

The specific implementations can refer to the implementations of the above method or UE.

For the sake of description, all the parts of the above-mentioned device are divided into various modules or units by function, which are described respectively. Of course, the functions of the various modules or units may be implemented in the same one or more software or hardware when the present application is implemented.

In summary, in the technical solutions provided by the embodiments of the present application, when the network determines that the condition needs to be met, the SMS over NAS update of the UE is performed.

Specifically, the update is performed directly through the configuration update command; the UE is triggered by the configuration update command to initiate the registration update procedure to negotiate the update; the update is completed through the response message of the procedure triggering the condition update (e.g., Deregistration); and the update is completed through the response message of the service procedure (e.g., Service Request) or the response message of the SMS MO.

In this solution, the network side triggers the update of the SMS over NAS support capability, avoiding the UE from making a wrong SMS MO attempt.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Various modifications and variations to the present application may be made. Thus, the present application is also intended to encompass these modifications and variations therein as long as these modifications and variations to the present application come into the scope of the claims of the present application and their equivalents.

What is claimed is:

1. A method for updating Short Message service, SMS, over Non Access Stratum, NAS, support capability of a User Equipment (UE), comprising:
   determining, by an access and mobility management function (AMF), that SMS over NAS support capability update needs to be triggered; and
   updating, by the AMF, SMS over NAS support capability of the UE;
   wherein the updating, by the AMF, SMS over NAS support capability of the UE comprises:
   triggering, by the AMF, through a configuration update procedure, the UE to initiate a registration update procedure to update the SMS over NAS support capability; or
   updating, by the AMF, the SMS over NAS support capability of the UE through a configuration update procedure.

2. The method of claim 1, wherein the triggering, by the AMF, through the configuration update procedure, the UE to initiate the registration update procedure to update the SMS over NAS support capability, or the updating, by the AMF, the SMS over NAS support capability of the UE through a configuration update procedure comprises:
   sending, by the AMF, an indication of SMS over NAS in the configuration update procedure, wherein the indication of SMS over NAS indicates to the UE to update the SMS over NAS support capability of the UE.

3. The method of claim 1, wherein the triggering, by the AMF, through the configuration update procedure, the UE to initiate the registration update procedure to update the SMS over NAS support capability comprises:
   sending, by the AMF, an indication of UE re-registration in the configuration update procedure, wherein the indication of UE re-registration indicates to the UE to initiate a registration update procedure to update the SMS over NAS support capability.

4. The method of claim 1, wherein the AMF determines that the SMS over NAS support capability update needs to be triggered when at least one of following conditions occurs:
   a change in operator configuration causes a network to trigger a change in the SMS over NAS support capability;
   subscription data obtained from a User Data Management, UDM, function changes;
   policy information of the UE changes;
   a change in information is obtained through a Short Message Service Function, SMSF; or
   the UE performs a deregistration procedure of which an access type is non-3rd generation partnership project, non-3GPP.

5. A method for updating Short Message Service, SMS, over Non Access Stratum, NAS, support capability of a User Equipment, UE, comprising:
   receiving, by a UE, a trigger for SMS over NAS support capability update in a configuration update procedure from an Access and Mobility Management Function, AMF; and
   updating, by the UE, the SMS over NAS support capability of the UE according to the trigger from the AMF.

6. The method of claim 5, wherein the receiving, by the UE, the trigger for SMS over NAS support capability update in the configuration update procedure from the AMF comprises:
   receiving, by the UE, an indication of SMS over NAS in the configuration update procedure, wherein the indication of SMS over NAS indicates to the UE to update the SMS over NAS support capability of the UE.

7. The method of claim 5, wherein the receiving, by the UE, the trigger for SMS over NAS support capability update in the configuration update procedure from the AMF comprises:
   receiving, by the UE, an indication of UE re-registration from the AMF in the configuration update procedure, wherein the indication of UE re-registration indicates to the UE to initiate a registration update procedure to update the SMS over NAS support capability of the UE.

8. The method of claim 7, wherein the updating, by the UE, the SMS over NAS support capability of the UE according to the trigger from the AMF comprises:
   updating, by the UE, the SMS over NAS support capability by initiating the registration update procedure, wherein the registration update procedure is triggered by the configuration update procedure.

9. An access and mobility management function (AMF), comprising:
   a processor and a memory; wherein the processor is configured to read programs in the memory to execute the following:
   determining that Short Message service, SMS, over Non Access Stratum, NAS, support capability update needs to be triggered;
   updating SMS over NAS support capability of a user equipment (UE);
   wherein the updating of the SMS over NAS support capability of the UE comprises:
   triggering through a configuration update procedure, the UE to initiate a registration update procedure to update the SMS over NAS support capability; or updating the SMS over NAS support capability of the UE through a configuration update procedure.

10. The AMF of claim 9, wherein the triggering through the configuration update procedure, the UE to initiate the registration update procedure to update the SMS over NAS support capability, or updating the SMS over NAS support capability of the UE through a configuration update procedure comprises:
    sending an indication of SMS over NAS in the configuration update procedure, wherein the indication of SMS over NAS indicates to the UE to update the SMS over NAS support capability of the UE.

11. The AMF of claim 9, wherein the triggering through the configuration update procedure, the UE to initiate the registration update procedure to update the SMS over NAS support capability comprises:
    sending an indication of UE re-registration in the configuration update procedure, wherein the indication of UE re-registration indicates to the UE to initiate a registration update procedure to update the SMS over NAS support capability.

12. The AMF of claim 9, wherein the processor determines that the SMS over NAS support capability update needs to be triggered when at least one of following conditions occurs:
    a change in operator configuration causes a network to trigger a change in the SMS over NAS support capability;
    subscription data obtained from a User Data Management, UDM, function changes;
    policy information of the UE changes;
    a change in information is obtained through a Short Message Service Function, SMSF; or
    the UE performs a deregistration procedure of which an access type is non-3rd generation partnership project, non-3GPP.

13. A User Equipment (UE), comprising:
    a processor and a memory; wherein the processor is configured to read programs in the memory to execute the method according to claim 5.

14. The UE of claim 13, wherein the receiving the trigger for SMS over NAS support capability update in the configuration update procedure from the AMF comprises:
    receiving an indication of SMS over NAS in the configuration update procedure, wherein the indication of SMS over NAS indicates to the UE to update the SMS over NAS support capability of the UE.

15. The UE of claim 13, wherein the receiving the trigger for SMS over NAS support capability update in the configuration update procedure from the AMF comprises:
    receiving an indication of UE re-registration from the AMF in the configuration update procedure, wherein the indication of UE re-registration indicates to the UE to initiate a registration update procedure to update the SMS over NAS support capability of the UE.

16. The UE of claim 15, wherein the updating the SMS over NAS support capability of the UE according to the trigger from the AMF comprises:
    updating the SMS over NAS support capability by initiating the registration update procedure, wherein the registration update procedure is triggered by the configuration update procedure.

* * * * *